(12) United States Patent
Lewy

(10) Patent No.: US 12,542,194 B1
(45) Date of Patent: Feb. 3, 2026

(54) METHOD AND SYSTEM FOR IDENTIFYING SMALL MOLECULE BINDERS WITHIN DNA-ENCODED LIBRARY DATASET

(71) Applicant: CAMBRIDGE MOLECULAR LTD, Cambridge (GB)

(72) Inventor: Guy Peter Lewy, London (GB)

(73) Assignee: CAMBRIDGE MOLECULAR LTD, Cambridge (GB)

( * ) Notice: Subject to any disclaimer, the term of this patent is extended or adjusted under 35 U.S.C. 154(b) by 0 days.

(21) Appl. No.: 19/187,919

(22) Filed: Apr. 23, 2025

(51) Int. Cl.
| | | |
|---|---|---|
| *G01N 33/48* | (2006.01) | |
| *G16B 15/30* | (2019.01) | |
| *G16B 35/20* | (2019.01) | |
| *G16B 45/00* | (2019.01) | |

(52) U.S. Cl.
CPC ............ *G16B 15/30* (2019.02); *G16B 35/20* (2019.02); *G16B 45/00* (2019.02)

(58) Field of Classification Search
None
See application file for complete search history.

(56) References Cited

U.S. PATENT DOCUMENTS

| | | |
|---|---|---|
| 2011/0301858 A1 | 12/2011 | Jones |
| 2013/0090247 A1 | 4/2013 | Gardner |
| 2023/0130619 A1 | 4/2023 | Ma et al. |

OTHER PUBLICATIONS

Peterson, Alexander A., and David R. Liu. "Small-molecule discovery through DNA-encoded libraries." Nature Reviews Drug Discovery 22.9 (2023): 699-722.*

Chen, Qi, Richard E. Higgs, and Michal Vieth. "Geometric accuracy of three-dimensional molecular overlays." Journal of chemical information and modeling 46.5 (2006): 1996-2002.*

* cited by examiner

*Primary Examiner* — Anna Skibinsky
(74) *Attorney, Agent, or Firm* — Perry + Currier Inc.

(57) ABSTRACT

Disclosed is a computer-implemented method for identifying small molecule binders within a DNA-encoded library (DEL) dataset. Said method comprises: obtaining a DEL dataset comprising enriched compounds; grouping enriched compounds into one or more compound groups based on a grouping criterion selected from at least one of: chemotype, library, enrichment level, or linear feature; generating a plurality of three-dimensional (3D) conformers, for each enriched compound in each compound group; comparing generated 3D conformers within one or across two or more compound groups to identify consensus overlays based on similarity metrics exceeding a predefined threshold; and selecting small molecule compounds forming said cross-group consensus overlays as small molecule binders having affinity for a target of interest. Disclosed also is a system for identifying small molecule binders within a DEL dataset. Said system comprising: a processor configured to perform aforementioned steps of method and an interface for displaying selected small molecule binders.

18 Claims, 3 Drawing Sheets

METHOD AND SYSTEM FOR IDENTIFYING SMALL MOLECULE BINDERS WITHIN DNA-ENCODED LIBRARY DATASET

TECHNICAL FIELD

The present disclosure relates to computer-implemented methods for identifying small molecule binders within DNA-encoded library (DEL) datasets. Moreover, the present disclosure relates to systems for identifying small molecule binders within DNA-encoded library (DEL) datasets. Furthermore, the present disclosure relates to computer-readable media storing computer program instructions which, when executed by processors, cause the processors to perform the computer-implemented methods.

BACKGROUND

DNA-Encoded Libraries (DELs) are powerful tools that allow rapid identification of potential small molecule binders to biological targets, to enable small molecule drug discovery. In this regard, DEL enables screening vast chemical spaces efficiently by encoding chemical compounds with unique DNA tags. However, DEL datasets often contain a significant proportion of artefactual compounds, i.e. false positives, that do not genuinely bind to the target of interest. This complicates a critical bottleneck in the drug discovery process, as only a small number of compounds can be manually chosen from an extremely large DEL dataset for expensive and time-consuming confirmatory testing (i.e. their resynthesis and assay in a high-fidelity binding or activity assay). As such, any false-positives chosen for confirmatory testing bring about a significant waste of lab resources and time, and also mean potential binders may be missed. But this confirmatory testing is the necessary next step towards identifying viable drug candidates, so maximising its efficiency is beneficial.

Conventional processes for selecting which small group of compounds to resynthesise from amongst a large DEL dataset include statistical methods and experimental techniques. Statistical methods involve ranking DEL hits based on their DNA sequence counts or signal strength, or an enrichment metric directly derived from these values, often using simple tools like Microsoft Excel. While intuitive, these methods frequently yield high false-positive rates, as many compounds with strong signals are artefactual and lack actual binding affinity. More sophisticated statistical pipelines have been developed, but they still suffer from the same fundamental limitation: the assumption that higher signal strength correlates with genuine binding. Experimental approaches, such as adding polynucleotide affinity tags to the end of the DEL barcodes, or leveraging orthogonal selections and additional DNA sequencing runs, aim to decrease the false-positive rate but often introduce new artefacts and significantly increase costs. While computational structural methods have also been explored as a way of decreasing the false-positive rate, they rely on protein crystal structures, which are not always available or reliable. These are also, like all docking methods, not generally reliable in predicting the complex molecular interactions between individual DEL hits and the target.

Therefore, in light of the foregoing discussion, there exists a need to overcome the aforementioned drawbacks.

SUMMARY

The aim of the present disclosure is to provide a computer-implemented method and a system to identify small molecule binders with affinity to a macromolecular target of interest, based on their chemical structures, three-dimensional (3D) structural models derived therefrom, and consensus overlays generated from the 3D structural models. The method and system also enable reliable virtual screening that can render available to a laboratory genuine binders prior to the completion of the time-consuming resynthesis step(s), which can decrease the time taken to achieve a project goal. The aim of the present disclosure is achieved by a computer-implemented method and a system for identifying small molecule binders within a DNA-encoded library (DEL) dataset as defined in the appended independent claims to which reference is made. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
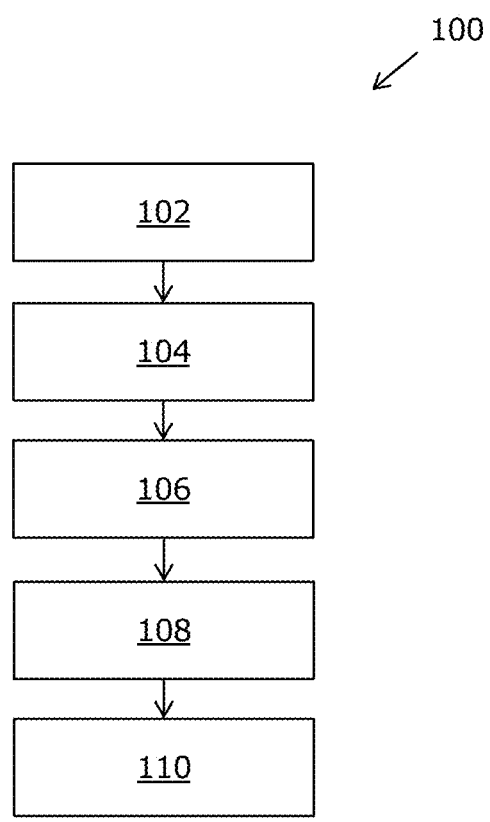
FIG. 1 is an illustration of a flowchart depicting steps of a computer-implemented method for identifying small molecule binders within a DNA-encoded library (DEL) dataset, in accordance with an embodiment of the present disclosure.

The following detailed description illustrates embodiments of the present disclosure and ways in which they can be implemented. Although some modes of carrying out the present disclosure have been disclosed, those skilled in the art would recognise that other embodiments for carrying out or practising the present disclosure are also possible.

In a first aspect, the present disclosure provides a computer-implemented method for identifying small molecule binders within a DNA-encoded library (DEL) dataset, the computer-implemented method comprising:
- obtaining a DEL dataset comprising enriched compounds;
- grouping the enriched compounds into one or more compound groups based on a grouping criterion selected from at least one of: chemotype, library, enrichment level, or linear feature;
- generating a plurality of three-dimensional (3D) conformers, for each enriched compound in each compound group;
- comparing the generated 3D conformers within one or across two or more compound groups to identify intra-group or cross-group consensus overlays based on similarity metrics exceeding a predefined threshold; and selecting small molecule compounds forming said intra-group or cross-group consensus overlays as small molecule binders having affinity for a target of interest.

The present disclosure provides a novel approach to analysing a DEL dataset for small molecule drug discovery, small molecule agrochemical discovery, or small molecule cosmetic compound discovery. In this regard, the disclosed method leverages the generation and comparison of three-dimensional (3D) conformers of enriched compounds from the dataset to enable identification of structural consensus overlays that would be unlikely to arise from chemical artefacts. This substantially reduces the false-positive rate in compound selection. The cross-group overlays share similar three-dimensional arrangements, despite originating from different structural groups, suggesting a common binding mode to the target of interest, thus, providing strong evidence for genuine target engagement. Therefore, the disclosed method provides a comprehensive solution for DEL-based drug discovery by reliable identification of true positive hits. The synergistic effect of these features enables significant reduction in the proportion of false positives in their selection of compounds for resynthesis, leading to more informed decision-making about resource allocation in follow-up experiments, and identification of high-quality datasets that are more likely to yield productive outcomes, as well as facilitating access to additional chemical matter through virtual screening without incurring the immediate costs or time delays of compound resynthesis. By enabling virtual screening against readily accessible catalogues, the disclosed method not only streamlines and de-risks the identification process but also provides a faster and parallel route to obtaining chemical matter, ultimately accelerating the pace of drug development while maintaining high standards of accuracy.

In a second aspect, the present disclosure provides a computer-readable medium storing computer program instructions which, when executed by a processor, cause the processor to perform the computer-implemented method for identifying small molecule binders within a DEL dataset.

In a third aspect, the present disclosure provides a system for identifying small molecule binders within a DNA-encoded library (DEL) dataset, the system comprising:
a processor configured to:
  obtain a DEL dataset comprising enriched compounds;
  group the enriched compounds into one or more compound groups based on a grouping criterion selected from at least one of: chemotype, library, enrichment level, or linear feature;
  generate a plurality of three-dimensional (3D) conformers, for each enriched compound in each compound group;
  compare the generated 3D conformers within one or across two or more compound groups to identify intra-group or cross-group consensus overlays based on similarity metrics exceeding a predefined threshold; and
  select small molecule compounds forming said intra-group or cross-group consensus overlays as small molecule binders having affinity for a target of interest; and
an interface for displaying the selected small molecule binders.

The disclosed system provides a novel solution for accurately identifying true binders, reducing the resynthesis of false positive (i.e. non-binding for the target of interest) compounds, and optimising resource allocation in the drug discovery process. In this regard, the present disclosure integrates advanced computational techniques with chemical informatics and knowledge of the mechanics of DEL synthesis.

The method comprises obtaining the DEL dataset comprising the enriched compounds. The term "small molecule binders" refers to chemical entities, typically, with low molecular weight that are capable of interacting with biological targets, namely, the target of interest, such as proteins, through specific binding interactions. The term "DNA-encoded library (DEL) dataset" refers to a collection of chemical compounds, namely enriched compounds or small molecule compounds, each tagged with a unique DNA sequence that encodes its identity. Within a DEL dataset, enriched compounds are those whose DNA sequences appear more frequently in the dataset's DNA-sequencing results (e.g. have the highest read-counts, or the highest multiple in read-counts between the target-selected dataset and a control no-target or column-only selection). While it is sometimes expected that more enriched compounds have higher affinity or activity to the target of interest, as determined by the application of laboratory binding or activity assays, in fact the imperfect yields of on-DNA reaction chemistry, the presence of differing reaction schemes from library to library, and the presence of DNA barcodes attached to side-products of their encoded reactions means that in reality this correlation is often low or non-existent.

In an embodiment, the small molecule binder is used as or developed into at least one of: a drug, an agrochemical, a cosmetic compound. Herein, the small molecule binder may find application (i.e. may be used as or further developed into) in its current form, or it can be further modified, formulated, or optimised to become a final product as one of drugs, agrochemicals or cosmetic compounds. In an embodiment, the small molecule binder may be used as or further developed into a drug for treating diseases or mitigating a medical condition. The term "drug" refers to a substance that is formulated for use in the diagnosis, cure, mitigation, treatment, or prevention of disease in humans or animals. Alternatively, the small molecule binder may find application as an agrochemical compound for improving crop yield or targeting the pathogens of crops. The term "agrochemical" refers to a chemical product used in agriculture, including pesticides, herbicides, and fertilisers, aimed at enhancing crop yield and protecting plants from pests and diseases. Yet alternatively, the small molecule binder may find application as a cosmetic compound for skincare or haircare products. In an example, a small molecule binder for a cancer-related protein may be developed into a drug candidate, based on the drug regulatory authorities of a given jurisdiction.

The term "affinity" refers to the strength of the interaction between a given small molecule binder and its corresponding target of interest, often quantified by the dissociation constant (Kd) or binding free energy. The term "target of interest" refers to a specific biological macromolecule that is the focus of investigation for therapeutic, diagnostic, agrochemical, or other research purposes. The small molecule binders are identified from collections of small molecule compounds using screening technologies such as high-throughput screening methodologies or DEL. The target is most often a protein, but may be a polynucleotide or other biological macromolecule.

The DEL dataset serves as input data for the disclosed method and contains information about the structural and sequence information of the small molecule compounds that have been subjected to a selection process against the target of interest. The DEL dataset comprises a long list of DNA barcodes that were found associated with the target of interest after a complex mixture of DEL compounds is allowed to mix with the target of interest, before being pulled down and DNA-sequenced and decoded to chemical structures, which in the dataset may be represented in the standard SMILES text format. The dataset also encodes the number of times each barcode was sequenced (the "read-count" of each barcode).

One known shortcoming of DELs is the formation of side-products at the non-barcode end of the DEL compound during the DEL synthesis process. These side-products are a known source of false-positive data points in DEL datasets. One of the benefits of the present invention is the filtering out of a large proportion of such artefactual hits.

Beneficially, many of the compounds apparently enriched within a DEL dataset will both correctly match the compound encoded by the attached DNA barcode, and have high affinity to the target used. If these or their analogues can be synthesised, it leads to the discovery of novel small molecule binders that can interact with specific biological targets, which is essential in drug discovery and development. Many apparently enriched compounds, however, if synthesised and tested, show no affinity to the target, as the signal was artefactual, generally generated by an unrecorded side-product of the encoded reactions. The more streamlined and robust the process of identifying DEL compounds with genuine high affinity, the less time and fewer resources are wasted for a given project.

In this context, an enriched compound is one whose DNA barcode occurs a higher than average number of times, a maximum amount of times relative to other DNA barcodes, or a high multiple of times compared to the number of times that DNA barcode occurs in a control selection such as a matrix-only selection or no-target, no-matrix "naïve selection".

Accordingly, the method comprises grouping the enriched compounds into one or more compound groups based on a grouping criterion selected from at least one of: chemotype, library, enrichment level, or linear feature. The term "compound groups" refers to collections of chemical entities that share common structural or functional characteristics. In this regard, the various enriched compounds are divided into groups, namely compound groups, to enable segregation thereof for a dedicated search amongst that group. In this regard, the compound groups are created based on grouping criteria. The term "grouping criterion" refers to the specific parameters or rules applied to categorise the enriched compounds into distinct groups based on their properties or behaviours. In this regard, the enriched compounds from the DEL dataset are categorised into structurally orthogonal compound groups, which may include feature-groups, library-groups, chemotype-groups, or a combination thereof. A group may consist of one compound or of multiple compounds. Beneficially, such categorisation allows for a more organised analysis and a more reliable selection of high-affinity compounds based on their structural characteristics. Herein, the term "chemotype" refers to a classification of compounds based on their chemical structure and functional groups, which may influence their biological activity. The term "library origin" refers to the source or method by which a particular chemical library was generated, including the list of building blocks and reaction scheme/s utilised. The term "enrichment level" refers to the degree to which specific compounds are overrepresented in a dataset, defined more specifically above. The term "linear feature" refers to the lines of enriched hits visible in a cube or square plot in which building block numbers are on the axes, and only hits above a threshold of signal (e.g. copy-count or enrichment) are plotted. For example, in a 3-cycle DEL library, a linear feature is synonymous with an enriched disynthon. Formally, a linear feature is a group of compounds in which n–1 (n being the number of building block slots used to construct the library) of the building block slots are fixed, one building block slot is allowed to vary, and the resulting group demonstrates multiple enriched compounds.

For example, if the enriched compounds include compounds with similar core structures these may be grouped into a "chemotype group". Alternatively, compounds from the same synthetic library may be grouped into a "library group". It may be appreciated that a given molecule may be a part of one or more groups based on the grouping criterion. Optionally, each group can consist of a varying number of compounds, typically ranging from 1 to 15, such as 1 to 10, or at least 1 to 5.

The greater the number of compounds in a group, the greater will be the diversity of compounds, and hence reliability of the chemical consensus, but the longer will be the process of generating conformers and combinatorially comparing them to create consensus overlays. The inventor has found the optimal balance lies with groups consisting of five to ten compounds, and in general, where it is possible within the dataset, specifically of five compounds.

Retrospective research reveals a surprisingly strong correlation between assayed affinity/activity and the presence of the assayed compound within a cross-group 3D overlay consensus, in which compounds with significantly different 2D structures have similar low-energy conformations and are able to make similar hydrogen-bond, hydrophobic, and/or Van der Waals interactions as each other. The same is true for compounds within high-quality intra-group 3D overlays.

In an embodiment, the one or more compound groups comprises at least one of: feature-groups, library-groups, chemotype-groups, manually-created groups. Throughout the present disclosure, the term "feature-groups" refers to collections of compounds that exist within the same linear feature as each other. Optionally, they may be the n compounds having the highest signal within their feature. The term "library-groups" refers to subsets of a DNA-Encoded Library Dataset that derive from the same DEL library. The term "chemotype-groups" refers to classifications of compounds that exhibit similar chemical structures or functional groups, which may correlate with their biological functions or activities. The term "manually-created groups" refers to clusters of compounds that have been organised by an individual based on subjective criteria or expert knowledge, rather than through automated or algorithmic methods.

Moreover, the method comprises generating a plurality of three-dimensional (3D) conformers, for each enriched compound in each compound group. The term "three-dimensional (3D) conformers" refers to computational representations of the spatial arrangement of atoms (and optionally also of the pharmacophoric features and linker vector) of the small molecule compounds. Such spatial arrangement of atoms and pharmacophoric features of the small molecule compounds define the binding interactions thereof with the target of interest. It may be appreciated that a conformer is explicitly 3D; however, it is generated from two-dimensional (2D) structures. Therefore, optionally, the method comprises generating a 2D structure for generating the plurality of 3D conformers. Moreover, 3D conformers are generated for each compound in the DEL dataset to enable structural comparisons. Beneficially, the 3D conformers allow for a detailed representation of molecular structures that enable the subsequent method steps' search for intra-group and cross-group 3D consensus overlays. The generated conformers in essence form the raw material from which the subsequent method steps can generate cross-group overlays. It is the DEL hits that successfully fall within a successful cross-group overlay that have an elevated likelihood of genuine affinity, and should be identified for resynthesis and/or use as virtual screening queries.

In an embodiment, the step of generating the plurality of 3D conformers involves employing at least one of: distance geometry methods, energy minimisation using a molecular force field. In this regard, spatial representations of the enriched compounds are created by using molecular modelling techniques, such as distance geometry methods (based on distance constraints between atoms) and energy minimisation (to achieve low-energy states representing biologically relevant structures) using molecular forcefields. In an example, an enriched compound is modelled in 3D using distance constraints, and the generated 3D conformer is refined to achieve a low-energy conformation. The integration of distance geometry methods and energy minimisation leads to the production of conformers that are both energetically favourable and biologically relevant, thereby enhancing the reliability of subsequent comparisons. Reliable conformer generation methods are known to those of normal skill in computation chemistry, and any reliable method can be used in the present method. In one embodiment, 50-200 conformers are generated per compound and energy-minimised. In another, 500-600 conformers are generated and energy-minimised. In another, 1000-1100 conformers are generated and energy-minimised. All conformer numbers will yield results, but higher numbers increase both the processing time and the probability of finding a higher number of good overlays. Different users of the method will have different preferences for this trade-off.

Additionally, optionally, an overlap-maximisation algorithm, such as a gradient-descent exhaustive minimisation algorithm, exhaustive similarity comparison of all inertial flips of each conformer about its principal axes, or flexible alignment algorithm may be applied during comparison of intra-group or cross-group conformer pairs. The overlap-maximisation algorithm allows for the exploration of conformer-on-conformer transformation space through various transformations, including translations, rotations, bond-rotations, and flips. This step is beneficial because two conformers under comparison may have very similar shapes, pharmacophores, and linker vectors, but due to the fact that molecules do not have a canonical "right way up", the conformers may exist within the computational system in dissimilar orientations, rendering a shape comparison ineffective in determining that they are in fact similarly shaped. To maximise the effectiveness of a shape comparison algorithm, the two conformers being compared must first be aligned against each other as accurately as possible. Beneficially, during intra-group and cross-group overlay generation, the confident labelling of two conformers' shapes as similar can only be done if various relevant mutual orientations have been compared. As such, applying an overlap-maximisation algorithm before measuring a pair of conformers' overlap enables the formation of more certain intra-group and cross-group overlays, and hence the identification of true small molecule binders with high confidence. In another implementation, conformers are canonicalised before comparison, reducing the need for an overlap maximisation algorithm. It will be appreciated that the conformers may be generated a single time for the DEL libraries themselves instead of per DEL dataset. Specifically, the obtaining of a DEL dataset comprising enriched compounds may occur either before or after the conformer generation and comparison steps. It will further be appreciated that a numerical representation of conformers may be saved and used for comparisons instead of direct shape comparison of the conformers themselves.

The method comprises comparing the generated 3D conformers within one or across two or more compound groups to identify intra-group and cross-group consensus overlays based on similarity metrics exceeding a predefined threshold. The term "intra-group consensus overlays" refers to the structural alignments of the 3D conformers between compounds of a single group of enriched compounds within the DEL dataset. The term "cross-group consensus overlays" refers to the structural alignments of the 3D conformers from between different groups of enriched compounds within the DEL dataset. They may also be known as "cross-group 3D clusters". High-quality intra-group or cross-group overlays are likely to bind reliably to the same site on the target of interest for the following three reasons:

1) Side-products have very varied shapes, rendering an alignment of DEL compounds in which their signal is derived from side-products unlikely. As such, the presence of a shape consensus amongst enriched compounds suggests that the expected canonical product for each DEL compound is responsible for its elevated signal, not side-products. Resynthesis and assay of such compounds is more reliable than that of compounds that are contaminated with side-product signal.

2) The fact that the high-signal compounds are making similar intermolecular interactions with an unseen binding site suggests that those interactions are optimal, and hence should be usefully explored in follow-up labwork.

3) The consistent size suggests that the variable building block position is constrained and therefore situated not unproductively in solvent but productively within a binding site.

High-quality intra-group consensus overlays also indicate reliability of the compounds therein, albeit less strongly than high-quality cross-group consensus overlays. As such, the search for both high-quality intra-group consensus overlays and cross-group consensus overlays is beneficial.

High-quality intra-group consensus overlays also furnish conformers that can accelerate the search for cross-group consensus overlays. The most reliable compounds are those forming part both of high-quality intra-group consensus overlays and of a high-quality cross-group consensus overlay spanning a number of DEL libraries having orthogonal scaffolds. Depending on what mixture of intra-group and cross-group consensus overlays are generated from a particular DEL dataset, compounds may be selected for resynthesis from one or more such consensus overlay, and from any combination of intra-group and cross-group consensus overlays, depending on skilled decisions weighing the quality of the overlay and the selectivity preferences, enrichment profile, and physicochemical profile of the compounds therein.

Beneficially, structured grouping and subsequent comparison facilitate a more precise comparison of compound interactions, leading to improved identification of genuine small molecule binders based on their three-dimensional conformations.

The term "similarity metrics" refers to quantitative measures used to assess the degree of similarity between two or more molecular structures, herein, the intra-group or inter-group (or cross-group) 3D conformers, based on their chemical properties or spatial arrangements. A set of similarity metrics is employed to quantify the degree of resemblance between 3D conformers, both during the formation of intra-group consensus overlays and cross-group consensus overlays. The comparison process identifies consensus overlays, which represent common shapes or structural features among conformers of one compound group or between different compound groups. The term "predefined threshold" refers to a specific value or criterion established in advance to determine the acceptance or rejection of a particular result or outcome in the context of molecular screening or analysis. By applying a predefined threshold, the cross-group consensus overlays that meet or exceed this threshold are retained for further analysis, ensuring that only relevant and significant similarities are considered. For example, the predefined threshold may be a Tanimoto volume overlap of 0.7, 0.8, or 0.9 similarity between the compared 3D conformers. It may include additional thresholds such as the mean or max distance between each acceptor on a conformer and its nearest acceptor on the compared conformer not being more than, for example, 1.0, 1.5, or 2.0 angstroms. Similar thresholds can additionally or alternatively be set for donor and hydrophobe features. Further thresholds may be set for comparing the parsimony of linker vector locations and directions in two conformers being compared. For example, the exit points of each conformer may be required to be less than 1.5, 2.0, or 2.5 angstroms away from other, or their vectors less than 100, or 140, or 180 degrees apart from each other. Cross-group consensus overlays ensure identification of the most certain potential small molecule binders, and increase the likelihood of successful binding interactions, crucial in drug discovery and development processes. Setting consistent thresholds allows generation of consensus overlays of consistent quality. It will be appreciated that all such thresholds can be tightened and loosened. Loosening thresholds yields more consensus overlays of lower average quality. It will be appreciated that all such thresholds can be tightened and loosened. Loosening thresholds yields more consensus overlays of lower average quality. Tightening such thresholds yields fewer consensus overlays of higher average quality. Users of this method will choose looser or tighter thresholds to suit their use-case.

In an embodiment, the similarity metrics comprise at least one of: molecular shape overlap volume, pharmacophoric feature overlap volume, linker exit vector parsimony, Tanimoto volume overlap, Tanimoto pharmacophore point volume overlap, an aggregated, averaged, or maximum distance between each atom/pharmacophore point of a conformer and the closest atom/pharmacophore point of a comparison conformer, wherein the similarity metric may be calculated after the application of an overlap-maximisation algorithm.

Notably, the molecular shape overlap volume measures the degree to which the 3D spatial volumes of two 3D conformers align, to fit into each other, which is essential for determining whether they can occupy the same binding site on the target of interest. It may be appreciated that the molecular shape overlap volume complements pharmacophoric feature overlap volume by providing a broader structural comparison, while the latter focuses on specific functional groups. In this regard, the pharmacophoric feature overlap volume measures the alignment of key functional groups (e.g. hydrogen bond donors, hydrogen bond acceptors, hydrophobes, and aromatic rings) between two 3D conformers. Moreover, the linker exit vector parsimony evaluates the alignment of linker atoms and their directional vectors in the 3D conformers. Notably, the linkers, which connect the small molecule binding end of the DEL hit to its DNA barcode, are generally oriented similarly in crystal binding poses, so this should be reflected in overlay models. The linker exit vector parsimony works in conjunction with molecular shape and pharmacophoric feature overlap volumes to ensure that the entire molecule, including its linkers, is properly aligned and a realistic model of the compounds' binding modes. The Tanimoto volume overlap is a similarity metric that calculates the ratio of the overlapping volume of two 3D conformers to the total volume of the 3D conformers, to provide a normalised measure of shape similarity. Notably, the Tanimoto volume overlap is a more refined version of molecular shape overlap volume, as it normalises the overlap to account for differences in molecular size. Moreover, the Tanimoto pharmacophore point volume overlap measures the alignment of pharmacophoric points (e.g. hydrogen bond donors/acceptors, hydrophobes) between two 3D conformers, normalised by the total number of pharmacophoric points. This metric ensures that the functional groups critical for binding are not only aligned but also proportionally distributed across the conformers. Thus, the Tanimoto pharmacophore point volume overlap is a pharmacophore-specific counterpart to Tanimoto volume overlap, focusing on functional group alignment rather than overall shape. The aggregated, averaged, or maximum distance between each atom/pharmacophore point of a conformer and the closest atom/pharmacophore point of a comparison conformer metric calculates the distance between each atom or pharmacophoric point in one conformer and the closest corresponding atom or pharmacophoric point in the other conformer, to provide a detailed comparison of the spatial arrangement of atoms or pharmacophoric points, ensuring that the conformers are closely aligned at the atomic level. This metric complements the overlap-based metrics by providing a distance-based measure of similarity analogous to RMSD, which is particularly useful for identifying subtle misalignments. Consensus overlays that score highly in the above metrics may be referred to as high-quality consensus overlays. It will be appreciated that spheres or Gaussian function equivalents take the place of points in point overlap methods.

The term "overlap-maximisation algorithm" refers to a computational method for aligning 3D conformers in 3D space to maximise their structural overlap. This algorithm applies transformations such as rotations, translations, and flips to achieve the best possible alignment, prior to calculating the similarity metrics, thereby providing the most accurate comparison. Therefore, by using one or more of these similarity metrics, combined with the overlap-maximisation algorithm, the disclosed method provides a robust and accurate method for comparing 3D conformers, identifying intra-group and cross-group consensus overlays with high confidence, reducing resynthesis of false-positive compounds, and improving the reliability of the identification of small molecule binders. Moreover, by leveraging multiple metrics, the disclosed method ensures that both the overall shape and specific functional features of the compounds are considered, leading to more precise and meaningful results.

Furthermore, the method comprises selecting small molecule compounds forming said intra-group or cross-group consensus overlays as small molecule binders having affinity for a target of interest. Compounds from high-quality cross-group consensus overlays are preferable resynthesis candidates to those from high-quality intra-group consensus overlays, reflecting the greater level of parsimony across more divergent chemical matter. The small molecule compounds that have affinity for a target of interest are evaluated for acceptable signal, selectivity, and campaign-count metrics to ensure their viability, as per standard steps taken by DEL practitioners. Additionally, the small molecule binders within the DEL dataset are matched against catalogues of pre-generated conformers representing accessible small molecule binders, facilitating the rapid and inexpensive procurement of the small molecule binders by standard commercial channels, in a process commonly known as virtual screening. Beneficially, generating and comparing conformers leads to a more targeted selection of small molecule binders, resulting in a refined pool of candidates for further testing and development. The enablement of a 3D virtual screening process beneficially allows the procurement of hundreds of inexpensive and druglike compounds that may arrive at the lab in days or weeks, which allows the greater exploration of chemical space in a fast and resource-effective way.

In an embodiment, the step of comparing the generated 3D conformers across the two or more compound groups employs any of:
  an all-versus-all conformer comparison comprising:
    comparing each 3D conformer with all 3D conformers of other enriched compounds in the DEL dataset, respectively,
    adding each matching conformer to a stack, and
    generating cross-group consensus overlays from all stacks spanning more than one compound group;
  a hierarchical conformer comparison comprising:
    generating one or more intra-group stacks of 3D conformers, by comparing 3D conformers within the same compound group, respectively,
    generating one or more cross-group stacks of 3D conformers by using the 3D conformers from at least one successful intra-group stack from amongst the one or more intra-group stacks, and
    generating cross-group consensus overlays from the one or more cross-group stacks of 3D conformers, and/or
    comparing previously successful cross-group consensus overlays with the conformers of the one or more intra-group stacks of 3D conformers; and
  a mixed conformer comparison comprising generating cross-group consensus overlays from the generated plurality of 3D conformers by employing the all-versus-all conformer comparison for a first set of compound groups and the hierarchical conformer comparison for a second set of compound groups.

In this regard, the all-versus-all conformer comparison approach compares each 3D conformer with other 3D conformers in the DEL dataset in a particular pattern. The all-versus-all conformer comparison generates cross-group consensus overlays by identifying conformers that match across different compound groups. This method will never miss a match, but as it is an O(n^2) operation, will require significant processing time for larger DEL datasets. A hierarchical conformer comparison compares 3D conformers in a stepwise manner, starting with intra-group comparisons to generate intra-group stacks, followed by cross-group comparisons to generate cross-group stacks. In such a case, the intra-group stacks of compounds are created, and successful 3D conformers from these stacks serve as seed conformers for generating inter-group stacks, namely, the cross-group consensus overlays. The hierarchical approach introduces a possibility that some high-quality consensus overlays that would be generated by the all-versus-all conformer comparison approach or method will be missed, but also reduces the computational running time of the method by a large factor. The net outcome renders it a very useful approach for most datasets. It will be appreciated that each mode fits different use-cases, and may be combined within one run of the method. The intra-group stacks of compounds hereby created are also useful, in that the quality of these groups is also an indicator of the reliability of the DEL compounds therein as binders. Furthermore, the mixed conformer comparison is a hybrid approach that combines both the all-versus-all conformer comparison and hierarchical conformer comparison approaches. The mixed conformer comparison is used to generate cross-group consensus overlays by applying different comparison methods to different sets of compound groups. Beneficially, by offering multiple comparison strategies, the disclosed method accommodates DEL datasets of varying sizes and complexities, ensuring accurate identification of cross-group consensus overlays.

"Stack" and "overlay" are similar concepts in the context of this method, a stack referring to the data structure comprising the list of compounds and associated metadata, and the relevant consensus overlay referring to the 3D structural information attached to the stack. In relation to choosing compounds for resynthesis or virtual screening, both the stack and its linked consensus overlay contain the same compounds and can as such be used interchangeable for this purpose.

In an embodiment, the computer-implemented method further comprises the step of determining a quality score for each identified cross-group consensus overlay using the similarity metrics. The term "quality score" refers to a quantitative measure of the reliability and significance of a given cross-group consensus overlay. The quality score is determined using the similarity metrics and reflects the likelihood that the overlay represents genuine binding interactions. In this regard, quality assessment is based on the number of orthogonal groups represented in the overlay, ensuring that only overlays with conformers from a threshold number of groups are considered acceptable, thus providing high-quality overlays that can trigger further resource allocation for dataset follow-up. Beneficially, by assigning quality scores, the disclosed method ensures that resources are focused on the most promising candidates, improving the efficiency of the drug discovery process.

In an embodiment, the computer-implemented method further comprises eliminating false-positive compounds by excluding compounds that are absent from one or more cross-group consensus overlay. The term "false-positive compounds" refers to compounds within the DEL dataset that are incorrectly identified as small molecule binders due to experimental signal-processing artefacts. Typically, the false-positive compounds fail to form part of any cross-group consensus overlay. Therefore, the elimination of false-positive compounds involves excluding such compounds that do not form part of any cross-group consensus overlay. For example, a compound with a high enrichment level but no structural alignment with other compounds is excluded as a false-positive compound, as it is likely an artefact. Beneficially, the elimination of false-positive compounds improves the accuracy and reliability of the results, ensuring that only genuine small molecule binders are selected for further analysis.

In an embodiment, the computer-implemented method further comprises at least one of:
  subjecting at least one cross-group consensus overlay to form a query in a subsequent virtual screen into a catalogue of a plurality of pre-generated conformers representing a group of accessible small molecule compounds, prior to procurement of at least one small molecule from amongst the group of accessible small molecule compounds;
  a laboratory-based resynthesis of at least one compound selected as a small molecule binder.

In this regard, the term "virtual screening" refers to the computational process of searching a catalogue of a plurality of pre-generated conformers to identify compounds that match the cross-group consensus overlays. Herein, the term "query" refers to the at least one 3D conformer or the at least one cross-group consensus overlay used to search a catalogue of plurality of pre-generated conformers. The query is designed to identify compounds in the catalogue that are similar to the input structures. Typically, the query initiates the virtual screening process, where the at least one 3D conformers or the at least one cross-group consensus overlay are compared against a database of accessible small molecule compounds to identify compounds in the catalogue that share structural or functional similarities with the query structures. The term "catalogue" refers to a comprehensive collection of small molecule binders that are readily available for procurement, namely, accessible small molecule compounds, from commercial sources or internal availability databases within a company, for procurement and can be utilised in various experimental applications. The catalogue may be a virtual catalogue (i.e. directions for commercially available fast on-demand synthesis). Moreover, the term "laboratory-based resynthesis" refers to the experimental process of synthesising compounds identified as potential binders. Laboratory resynthesis of DEL hits and virtual screening of compounds related to DEL hits are complementary processes, both of which have relative advantages. Resynthesis of DEL hits' off-DNA moieties is the most direct test of DEL data, but while it can confirm high-affinity binders, it is laborious, expensive, and slow. Virtual screening is much faster to yield results, and an order of magnitude less expensive per compound, but adds an extra layer of uncertainty in that even if a query DEL hit is a true binder, derived virtual screening hits will have different structures and therefore may not themselves be. Experimental validation of compounds once procured via resynthesis or internal request/commercial purchase from a catalogue is well-known to DEL practitioners, and may include biophysical methods such as Surface Plasmon Resonance, or biochemical methods such as enzymatic assays. Beneficially, the steps of virtual screening and experimental validation through resynthesis enable rapid and cost-effective identification of potential small molecule binders. Carrying out both resynthesis and virtual screening simultaneously generates a good diversity profile for the tested chemical matter, and may yield active compounds very rapidly. Notably, quickly discovering active compounds through virtual screening may allow companies to increase the internal priority of the project even before resynthesis results are available.

In an embodiment, the computer-implemented method further comprises subjecting the at least one resynthesis-derived small molecule compound or the procured at least one accessible small molecule compound to a confirmatory binding or activity assay for assessing true-positive small molecule binders having affinity for the target of interest. Herein, the term "resynthesis-derived small molecule compound" refers to small molecule compounds that are chemically synthesised after initial identification from the DEL dataset to confirm their binding affinity to a target. The term "confirmatory binding or activity assay" refers to an experimental procedure conducted to validate the binding interactions between small molecule binders and their respective biological targets of interest, typically following initial screening results. The term "true-positive small molecule binders" refers to small molecule binders that have been accurately identified as having a genuine binding interaction with a target of interest, as confirmed by subsequent experimental validation. Beneficially, the confirmatory binding or activity assay ensures that only compounds with a high likelihood of being true-positive small molecule binders are selected for further testing, thereby optimising resource allocation, given the high costs and lengthy timelines associated with synthesising and testing such compounds. Depending on the project and the target, binding may be a useful end in itself (e.g. during creation of a PROTAC), or it may be a necessary precondition for a useful biochemical activity that is being sought, which may be assayed separately in an appropriate activity assay.

In an embodiment, when the plurality of 3D conformers or one of the conformers from a generated consensus overlay form a query, the computer-implemented method employs an overlap-maximisation algorithm between the query and each catalogue compound before assessing 3D similarity. The overlap-maximisation algorithm allows for the exploration of conformational space through various transformations, including translations, rotations, and flips between two or more compounds forming query or catalogue compounds. Optionally, the overlap-maximisation algorithm may be selected from the same list as during the generation of intra-group and cross-group consensus overlays. Similarity metrics may also be the same as during the generation of the consensus overlays. Beneficially, the generated 3D conformers of enriched compounds are accurate and biologically relevant, and serve as the foundation for subsequent structural comparisons with catalogue compounds during virtual screening, enabling the identification of true small molecule binders with high confidence.

In an embodiment, the computer-implemented method further comprises generating a plurality of two dimensional (2D) structures, wherein the plurality of 2D structures form a query in a subsequent virtual screen into a catalogue of a plurality of pre-generated 2D structures representing a group of accessible small molecule compounds, and wherein when the plurality of 2D structures form a query, the computer-implemented method comprises employing a search algorithm selected from a group comprising any of: fingerprint-based search algorithm, substructure-based search algorithm, or substructure-growing-based search algorithm before assessing 2D similarity. Substructure-growing algorithms may have a further criterion in addition to substructure presence which must be met, namely, that a substructure hit is only allowed if the non-substructural moieties mirror the moieties in the equivalent positions of the ancestral DEL hit that the substructure was derived from. Mirroring in this context refers to either not being larger than one atom or, if larger than one atom, having similar pharmacophoric features and being no larger than three to seven atoms, preferably no larger than five atoms.

In this regard, as mentioned above, 3D conformers are generated from two-dimensional (2D) structures. Therefore, the method comprises generating the plurality of 2D structure for generating the plurality of 3D conformers. The term "two-dimensional (2D) structures" refers to simplified, planar representations of chemical compounds that capture the connectivity of atoms and bonds but do not include spatial (3D) information. The 2D structures retain key chemical information, such as functional groups and connectivity, which are critical for identifying similar compounds in a catalogue. Optionally, the 2D structures may be derived from the enriched compounds in the DEL dataset or from cross-group consensus overlays. For example, a compound identified as part of a cross-group consensus overlay is converted into a 2D structure, showing its atoms (e.g. carbon, oxygen, nitrogen) and bonds (e.g. single, double, aromatic). Beneficially, 2D structures simplifies the representation of compounds, making them computationally efficient for virtual screening.

Similar to the virtual screen into a catalogue of a plurality of pre-generated conformers for comparing at least one cross-group consensus overlay having a three-dimensional structure, to assess 3D similarity, the disclosed method comprises virtual screening into a catalogue of a plurality of pre-generated 2D structures for assessing 2D similarity. Moreover, the disclosed method employs specific search algorithms to assess 2D similarity between the query 2D structures and the catalogue structures. Herein, the reference to the term "catalogue", "virtual screen", "query", etc., is similar to that described previously, but with reference to 2D structures.

In an example, a pharmaceutical company may maintain a catalogue of 3D conformers for 10 million commercially available compounds and a catalogue of 2D structures for 20 million commercially available compounds. The query, 3D or 2D, is screened against this catalogue to identify potential binders by their 3D or 2D structure.

Moreover, the disclosed method employs search algorithms to conduct searching or assessing similarities between the 2D structures and the catalogue compounds.

The fingerprint-based search algorithm is configured to encode the 2D structure of a small molecule compound into a compact binary or numerical fingerprint, which represents the presence or absence of specific chemical features (e.g. functional groups, bond types). The algorithm compares the fingerprints of the query and a large number of catalogue compounds to assess similarity. The substructure-based search algorithm is configured to match key functional groups or scaffolds to identify compounds in the catalogue that contain specific substructures or fragments present in the query compound. For example, a query compound with a quinazoline moiety is used to find catalogue compounds that also contain this moiety. The substructure-growing-based search algorithm is configured to check which atoms or bonds have been added by a catalogue compound in comparison to an initial smaller substructure (e.g. a functional group or scaffold) to grow the structure, while comparing these with the equivalent growth in the DEL hit from which was sourced the substructure. The substructure-growing-based search algorithm is related to the substructure-based search algorithm as it builds upon the concept of matching substructures. Referring to above example, substructure-growing-based search algorithm uses a query compound with a quinazoline moiety to find catalogue compounds that contain the same moiety but may only contain further moieties if they constitute a valid growth from the same attachment-points and with the same pharmacophoric features as moieties found attached to the DEL hit. Moreover, assessing 2D similarity may be a final step in any virtual screening process. Notably, assessing 2D similarity involves evaluating how closely the query structures match the catalogue structures based on the selected search algorithm. The similarity is typically quantified using a numerical score or ranking based on their structural similarity to the query, enabling the selection of the most relevant candidates for further analysis.

Beneficially, said algorithms provide a computationally efficient method for identifying accessible small molecule compounds that are structurally similar to the query compounds, thereby significantly enhancing the drug discovery process by streamlining the identification of potential binders. By using 2D structures and employing advanced search algorithms, the method enables rapid virtual screening of large catalogues, reducing the time and cost associated with experimental validation. The use of multiple search algorithms ensures flexibility and accuracy, allowing for the identification of compounds with varying degrees of similarity to the query.

In an embodiment, the computer-implemented method further comprises triaging the DEL dataset as a high-quality dataset or a low-quality dataset, based on potential of the DEL dataset to generate cross-group consensus overlays. The term "triaging DEL datasets" refers to the process of categorising datasets as high-quality or low-quality based on their potential to generate cross-group consensus overlays. Notably, the cross-group overlays serve as indicators of dataset quality. It may be appreciated that a high-quality dataset comprises data characterised as accurate, reliable, and comprehensive information, while the low-quality dataset comprises data that exhibits inaccuracies, inconsistencies, or incomplete information. In a drug discovery project context, multiple DEL experiments or DEL conditions are often tested simultaneously, without pre-existing knowledge of which experiment or condition will yield the most reliable data. As high-quality datasets yield reliable cross-group consensus overlays, this suggests that they contain valuable information for resynthesis and should be prioritised above any datasets that are unable to generate reliable cross-group consensus overlays. Conversely, low-quality datasets lack cross-group consensus overlays, indicating they may stem from unsuccessful experiments. It may further be appreciated that triaging is essential when multiple datasets are available, as it clarifies which datasets warrant further investment of resources for resynthesis efforts. In an example, if at least one cross-group consensus overlay of acceptable quality is produced, the DEL dataset is classified as high-quality. Beneficially, triaging enables efficient resource allocation by focusing on high-quality datasets.

The present disclosure also relates to the computer-readable medium as described above. Various embodiments and variants disclosed above, with respect to the aforementioned computer-implemented method, apply mutatis mutandis to the computer-readable medium.

The present disclosure also relates to the system as described above. Various embodiments and variants disclosed above, with respect to the aforementioned computer-implemented method and the aforementioned computer-readable medium, apply mutatis mutandis to the system.

The term "processor" refers to programmable and/or non-programmable components configured to execute one or more software applications for storing, processing, sharing data and/or set of instructions. It will be appreciated that the term "processor" refers to "one processor" in some implementations, and "a plurality of processors" in other implementations. In cases where the processor is a plurality of processors, the plurality of processors is communicably coupled to each other via a communication network. Optionally, the processor is a set of one or more hardware components or a multi-processor system, depending on a particular implementation. More optionally, the processor includes, for example, a component included within an electronic communications network. Additionally, the processor includes one or more data processing facilities for storing, processing, sharing data and/or a set of instructions. Optionally, the processor includes functional components, for example, a memory unit, a network adapter, and so forth.

The term "communication network" refers to a network of interconnected programmable and/or non-programmable components that are configured to facilitate data communication between one or more electronic devices and/or databases, such as the memory unit and the processor or software application, whether available or known at the time of filing or as later developed. Furthermore, the communication network may include, but is not limited to, one or more peer-to-peer network, a hybrid peer-to-peer network, local area networks (LANs), radio access networks (RANs), metropolitan area networks (MANS), wide area networks (WANs), all or a portion of a public network such as the global computer network known as the Internet, a private network, a cellular network and any other communication system or systems at one or more locations. Furthermore, the processor facilitates communication between the software application and the interface over the communication network, likely to execute tasks related to the system's function.

The processor first retrieves the DEL dataset, then uses the method described herein to ensure it includes enriched compounds that have a higher likelihood of binding to the target of interest. By processing the dataset in this manner, the system can efficiently pinpoint potential small molecule binders for further investigation, to streamline the identification of small molecule binders, which is essential in drug discovery and development processes.

The term "interface" refers to a shared boundary or point of interaction between two distinct systems, components, or entities, facilitating communication, data exchange, or functional integration between them. The interface is configured to receive inputs and transmit output. The interface ensures that the system is user-friendly and accessible to researchers and drug-discovery professionals.

In an embodiment, the system further comprises a software application, communicably coupled with the processor and the interface, configured to identify small molecule binders having affinity for a target of interest; and perform virtual screening of the 3D conformers. The term "software application" refers to a digital platform within the system that facilitates the interaction between the user and the system for identifying small molecule binders within the DNA-encoded library (DEL) dataset. The interface is a component of the software application that facilitates interaction between the user and the system for identifying small molecule binders within a DNA-encoded library (DEL) dataset. The processing arrangement is a computational component of the software application that is configured to identify small molecule binders within the DNA-encoded library (DEL) dataset.

In an embodiment, the system further comprises a memory unit for storing a DEL dataset, small molecule binders, and intra-group or cross-group consensus overlays. Herein, the "memory unit" refers to a data storage component that enables the system to store and manage critical information related to DEL dataset and small molecule binders within the DEL dataset. The memory unit ensures that the system can retain and manage essential information, such as DEL dataset, small molecule binders, and cross-group consensus overlays, for future reference, analysis, and sharing.

In an embodiment, the processor is further configured to determine a quality score for each identified intra-group or cross-group consensus overlay using the similarity metrics.

In an embodiment, the processor is further configured to triage the DEL dataset as a high-quality dataset or a low-quality dataset, based on potential of the DEL dataset to generate intra-group or cross-group consensus overlays.

EXPERIMENTAL PART

A downloadable software application, for which the present method forms part of the backend, was used. The name of the application is the Palladium DEL Follow-Up Suite. The method has been run computationally in many formats, including as a web-service, as a Jupyter Notebook based script, as the backend of the Palladium DEL Follow-Up Suite, and in other standard computational environments. The method has also been employed in small scale demonstrations in the form of a number of plastic molecular models. The user of the method is generally a computational chemist or DEL chemist at a large pharmaceutical company, a biotech, or an agrochemical company.

In one instance, the user at a large pharmaceutical company input their DEL dataset into the software, selected the type of compound groups to be analysed, then the system compiled the groups, generated conformers for each compound in each group, and compared the conformers to discover if there were neat cross-group overlays. These were then presented to the user, who decided to resynthesise DEL hits from the overlays, and to use two of the overlays as virtual screening queries into a commercial compound catalogue of interest. The software suite also includes 2D and 3D virtual screening tools according to the current method, and these were also used.

In this example, the pharmaceutical company screened DEL libraries containing hundreds of millions of compounds against a protein involved in cancer. Compounds from several high-quality cross-library overlays were resynthesised and all but one were found to be active. A simultaneous virtual screen into the Enamine In-Stock catalogue yielded 31 inexpensive and druglike hits with assayed dissociation constants of 10 µM or better. The project was able to continue to its next stage.

The comparison of two or more 3D conformers was deemed a match if the conformers were found to have sufficiently high scores in one or more of Tanimoto volume overlap, pharmacophore point volume overlap or Tanimoto overlap or a score based on aggregated maximum distance between each atom/pharmacophore point of a conformer and the closest atom/pharmacophore point of a comparison conformer, when these scores were normalised by atom count; the score also included pharmacophore vector similarity, and/or linker vector parsimony, and/or out-of-volume clash, or RMS distance between equivalent pharmacophore points. Linker atoms were removed for the purpose of these calculations. A scoring function was built from a fixed combination of these metrics. An all-versus-all comparison was used, comprising the comparison of each conformer in turn with all conformers of every other enriched compound in the dataset. Each matching conformer was added to the "stack", and collected as consensus groups all stacks spanning more than one compound group.

In a second run, a hierarchical comparison was used, which included first generating intra-group stacks of compounds, then using conformers from successful intra-group stacks as seed conformers for the generation of inter-group stacks. It also included a step that compared previously successful cross-group overlays with the full original list of original conformers. Exit vector parsimony was judged on the basis of the position of the proximal linker atom, and the direction of the exit vector, and was deemed parsimonious if either the positions of proximal linker atoms in conformers undergoing comparison were within a threshold distance, or if the angular discrepancy between pairs of exit vectors were all within a maximum angle threshold.

DETAILED DESCRIPTION OF THE DRAWINGS

Referring to FIG. 1, illustrated is a flowchart depicting steps of a computer-implemented method for identifying small molecule binders within a DNA-encoded library (DEL) dataset, in accordance with an embodiment of the present disclosure. At step 102, a DEL dataset comprising enriched compounds is obtained. At step 104, the enriched compounds are grouped into one or more compound groups based on a grouping criterion selected from at least one of: chemotype, library, enrichment level, or linear feature. At step 106, a plurality of three-dimensional (3D) conformers is generated for each enriched compound in each compound group. At step 108, the generated 3D conformers are compared across two or more compound groups to identify cross-group consensus overlays based on similarity metrics exceeding a predefined threshold. At step 110, small molecule compounds forming said cross-group consensus overlays are selected as small molecule binders having affinity for a target of interest.

Figure 2:
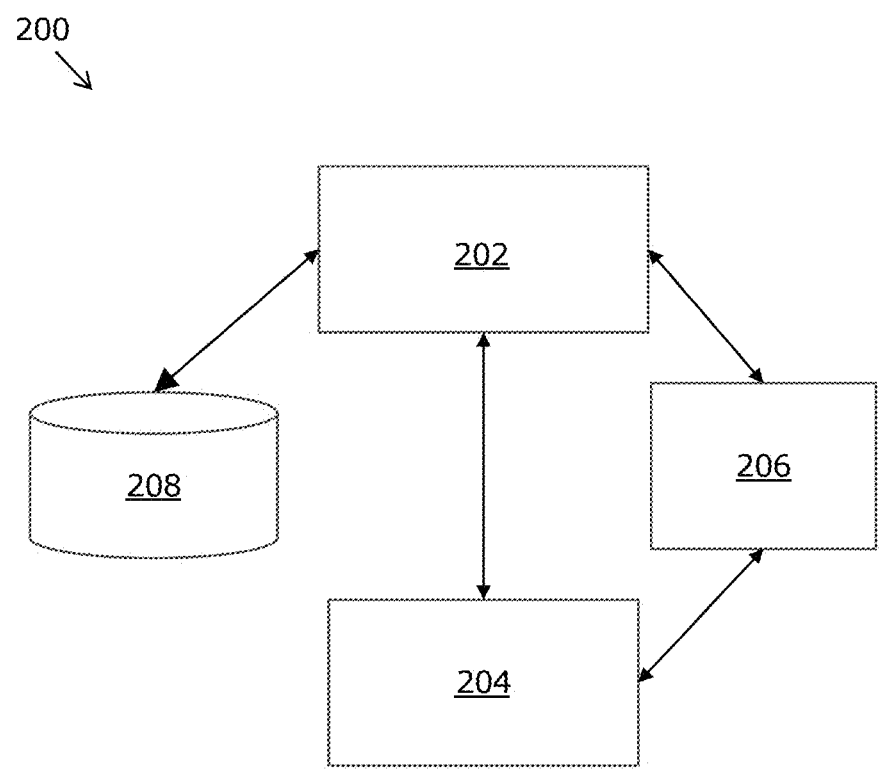
FIG. 2 is an illustration of a system for identifying small molecule binders within a DNA-encoded library (DEL) dataset, in accordance with an embodiment of the present disclosure.

Referring to FIG. 2, illustrated is a system 200 for identifying small molecule binders within a DNA-encoded library (DEL) dataset, in accordance with an embodiment of the present disclosure. The system 200 comprises a processor 202 and an interface 204. The processor 202 is configured to: obtain a DEL dataset comprising enriched compounds; group the enriched compounds into one or more compound groups based on a grouping criterion selected from at least one of: chemotype, library, enrichment level, or linear feature; generate a plurality of three-dimensional (3D) conformers, for each enriched compound in each compound group; compare the generated 3D conformers across two or more compound groups to identify cross-group consensus overlays based on similarity metrics exceeding a predefined threshold; and select small molecule compounds forming said cross-group consensus overlays as small molecule binders having affinity for a target of interest. The interface 204 is configured to display the selected small molecule binders. The system 200 further comprises a software application 206, communicably coupled with the processor 202 and the interface 204. The software application 206 is configured to identify small molecule binders having affinity for a target of interest; and perform virtual screening of the 3D conformers. The system 200 further comprises a memory unit 208 for storing a DEL dataset, small molecule binders, and cross-group consensus overlays.

Figures 3A, 3B:
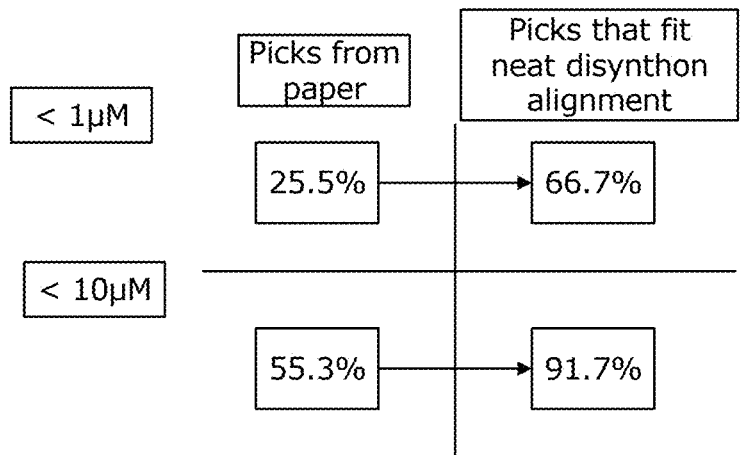
FIGS. 3A and 3B illustrate an exemplary experimental data correlating consensus overlays with the assay results, in accordance with an embodiment of the present disclosure.

Referring to FIGS. 3A and 3B, illustrated is an exemplary experimental data correlating consensus overlays with the assay results, in accordance with an embodiment of the present disclosure. As shown in FIG. 3A, off-DNA Kd of compound are recorded for best neat consensus overlay attempt containing assayed compound mean in DEL datasets. Herein, to confirm genuine small molecule binders, selected compounds are resynthesised without the DNA tag ("off-DNA") and tested in high-fidelity binding assays. Surface Plasmon Resonance, a sensitive biophysical technique, is used to measure real-time binding interactions and calculate Kd in nanomolar units, to indicate very tight binding (hence, best) if the Kd value is low. FIG. 3B shows that the overlay group "Overlay_7" having Kd values of 25 and 30 show high binding affinity, while the overlay group "Overlay_12" having Kd value of 1000 shows low binding affinity. Thus the overlay group "Overlay_7" is a neat overlay with strong binders.

The invention claimed is:

1. A method for resynthesizing small molecule binders within a DNA-encoded library (DEL) dataset, the method comprising:
   the computer-implemented steps of:
   obtaining a DEL dataset comprising enriched compounds;
   grouping the enriched compounds into one or more compound groups based on: library or linear feature;
   generating a plurality of three-dimensional (3D) conformers, for each enriched compound in each compound group;
   comparing the generated 3D conformers within one or across two or more compound groups to identify intra-group or cross-group consensus overlays based on similarity metrics exceeding a predefined threshold, the comparison employs a hierarchical conformer comparison comprising:
      generating one or more intra-group stacks of 3D conformers, by comparing 3D conformers within the same compound group, respectively,
      generating one or more cross-group stacks of 3D conformers by using the 3D conformers from at least one successful intra-group stack from amongst the one or more intra-group stacks,
      generating cross-group consensus overlays from the one or more cross-group stacks of 3D conformers, and
      comparing previously successful cross-group consensus overlays with the conformers of the one or more intra-group stacks of 3D conformers; and
   selecting small molecule compounds forming said intra-group or cross-group consensus overlays as small molecule binders having affinity for a target of interest; and
   a laboratory-based resynthesis of at least one compound selected as a small molecule binder.

2. The method of claim 1, further comprising the step of determining a quality score for each identified cross-group consensus overlay using the similarity metrics.

3. The method of claim 1, further comprising eliminating false-positive compounds by excluding compounds that are absent from one or more cross-group consensus overlay.

4. The method of claim 1, wherein the small molecule binder is used as at least one of: a drug, an agrochemical, a cosmetic compound.

5. The method of claim 1, wherein the one or more compound groups comprises at least one of: feature-groups, library-groups, chemotype-groups, manually-created groups.

6. The method of claim 1, wherein the step of generating the plurality of 3D conformers comprises employing at least one of: distance geometry methods, energy minimisation using a molecular force field.

7. The computer implemented method of claim 1, wherein the similarity metrics comprise at least one of: molecular shape overlap volume, pharmacophoric feature overlap volume, linker exit vector parsimony, Tanimoto volume overlap, Tanimoto pharmacophore point volume overlap, an aggregated, averaged, or maximum distance between each atom/pharmacophore point of a conformer and the closest atom/pharmacophore point of a comparison conformer, wherein the similarity metric may be calculated after the application of an overlap-maximisation algorithm.

8. The method of claim 1, further comprising:
   subjecting at least one cross-group consensus overlay to form a query in a subsequent virtual screen into a catalogue of a plurality of pre-generated conformers representing a group of accessible small molecule compounds, prior to procurement of at least one small molecule from amongst the group of accessible small molecule compounds; and
   subjecting the procured at least one accessible small molecule to a confirmatory binding or activity assay for assessing true-positive small molecule binders having affinity or activity against the target of interest.

9. The method of claim 1, further comprising subjecting the at least one resynthesis-derived small molecule binder to a confirmatory binding or activity assay for assessing true-positive small molecule binders having affinity or activity against the target of interest.

10. The method of claim 1, further comprising generating a plurality of two dimensional (2D) structures, wherein the plurality of 2D structures form a query in a subsequent virtual screen into a catalogue of a plurality of pre-generated 2D structures representing a group of accessible small molecule compounds, and wherein when the plurality of 2D structures form a query, the computer-implemented method comprises employing a search algorithm selected from a group comprising any of: fingerprint-based search algorithm, substructure-based search algorithm, or substructure-growing-based search algorithm.

11. The method of claim 1, wherein when the plurality of 3D conformers form a query, the computer-implemented method comprises employing an overlap-maximisation algorithm before assessing 3D similarity.

12. The method of claim 1, further comprising triaging the DEL dataset as a high-quality dataset or a low-quality dataset, based on potential of the DEL dataset to generate cross-group consensus overlays.

13. A computer-readable medium storing computer program instructions which, when executed by a processor, cause the processor to perform the computer-implemented method for identifying small molecule binders within a DEL dataset of claim 1.

14. A system for identifying small molecule binders within a DNA-encoded library (DEL) dataset, the system comprising:
 a processor configured to:
  obtain a DEL dataset comprising enriched compounds;
  group the enriched compounds into one or more compound groups based on library or linear feature;
  generate a plurality of three-dimensional (3D) conformers, for each enriched compound in each compound group;
  compare the generated 3D conformers within one or across two or more compound groups to identify intra-group or cross-group consensus overlays based on similarity metrics exceeding a predefined threshold, wherein the comparison employs a hierarchical conformer comparison comprising:
   generating one or more intra-group stacks of 3D conformers, by comparing 3D conformers within the same compound group, respectively,
   generating one or more cross-group stacks of 3D conformers by using the 3D conformers from at least one successful intra-group stack from amongst the one or more intra-group stacks,
   generating cross-group consensus overlays from the one or more cross-group stacks of 3D conformers, and
   comparing previously successful cross-group consensus overlays with the conformers of the one or more intra-group stacks of 3D conformers; and
  select small molecule compounds forming said cross-group consensus overlays as small molecule binders having affinity for a target of interest; and
 an interface for displaying the selected small molecule binders for a laboratory-based resynthesis.

15. The system of claim 14, further comprising a software application, communicably coupled with the processor and the interface, configured to
 identify small molecule binders having affinity for a target of interest; and
 perform virtual screening of the 3D conformers.

16. The system of claim 14, further comprising a memory unit for storing a DEL dataset, small molecule binders, and intra-group or cross-group consensus overlays.

17. The system of claim 14, wherein the processor is further configured to determine a quality score for each identified intra-group or cross-group consensus overlay using the similarity metrics.

18. The system of claim 14, wherein the processor is further configured to triage the DEL dataset as a high-quality dataset or a low-quality dataset, based on potential of the DEL dataset to generate intra-group or cross-group consensus overlays.

* * * * *